United States Patent [19]

Lemercier

[11] 4,055,464
[45] Oct. 25, 1977

[54] HEAT-INSULATING STRUCTURE

[75] Inventor: Guy Lemercier, Le Puy Sainte Reparade, France

[73] Assignee: Commissariat a l'Energie Atomique, Paris, France

[21] Appl. No.: 707,556

[22] Filed: July 22, 1976

[30] Foreign Application Priority Data

July 24, 1975 France .................................. 75.23152

[51] Int. Cl.² ........................................... G21C 15/10
[52] U.S. Cl. ....................................... 176/87; 176/40; 52/248; 220/9 D
[58] Field of Search ............... 176/40, 65, 87; 52/224, 52/248, 406, 410, 619; 220/9 D, 9CG

[56] References Cited

U.S. PATENT DOCUMENTS

| 3,346,016 | 10/1967 | Blau et al. ........................ 220/9 D X |
| 3,528,495 | 9/1970 | Armstrong et al. ................ 176/87 X |
| 3,764,468 | 10/1973 | Hind ........................................ 176/40 |
| 3,945,165 | 3/1976 | Lemercier .......................... 176/87 X |
| 3,945,887 | 3/1976 | Lemercier ............................. 176/87 |
| 3,952,777 | 4/1976 | Uhlig ................................ 220/9 D X |

Primary Examiner—Peter A. Nelson
Attorney, Agent, or Firm—Cameron, Kerkam, Sutton, Stowell & Stowell

[57] ABSTRACT

Structural elements which are each formed by two sectional members of substantial length are mounted in juxtaposed relation in the line of extension of each other. The two sectional members of each structural element are engaged one inside the other with a small clearance space between their parallel faces. A flexible packing of metallic material is enclosed between the sectional members so as to ensure that they are capable of working in pairs both along the length of said members and in the direction of engagement of these latter.

7 Claims, 6 Drawing Figures

HEAT-INSULATING STRUCTURE

This invention relates to a heat-insulating structure for protecting a zone or a portion of a wall or the like against the effects of a high-temperature atmosphere. The advantage of this structure lies in the fact that it can readily be adapted to the shape of the zone to be protected, especially within an annular space.

The invention applies more particularly although not in any exclusive sense to the case in which the wall to be protected is placed within a hazardous and corrosive atmosphere and even more especially in an atmosphere of aerosols or vapor of a liquid metal and especially liquid sodium within a fast reactor vessel.

To this end, the structure under consideration is constituted by a plurality of elements each formed by two sectional members of substantial length, the structure being distinguished by the fact that the elements aforesaid are mounted in juxtaposed relation in the line of extension of each other, the two sectional members of each element being engaged one inside the other with a small clearance space between their parallel faces, a flexible packing of metallic material being enclosed between the sectional members in such a manner as to ensure that said members can work in pairs both along the length and in the direction of engagement of these latter.

The flexible packing is constituted by a stack of wire fabric, wire mesh or interlooped wire elements or by means of a packing of steel wool or shavings.

As an advantageous feature and in accordance with either of two alternative embodiments, the sectional members have a cross-section in the shape of a U or of an L.

In accordance with a particular feature, each sectional member is provided at one end with an extension having a cross-section which is slightly smaller than the cross-section of the sectional member so as to permit of its engagement within the opposite end of a similar adjacent sectional member and to constitute a continuous casing having a length which is adapted to that of a zone to be protected.

In another embodiment, each sectional member is provided at one end with at least one slot for the engagement of said member within the opposite end of an adjacent sectional member.

Finally and in accordance with a particular feature, the flexible packing mounted between the sectional members comprises at least one small internal plate which is parallel to the bottom portion of the sectional members and limits the convection of heat through the packing.

By virtue of the presence of said flexible metallic packing within the interior of the sectional members, the structural elements in accordance with the invention have an appreciable degree of relative elasticity which permits sliding motion of the sectional members one inside the other with limited compression of their packings, thereby making it possible to absorb expansions of the structure in the direction of engagement of the sectional members. Moreover, the assembly of said sectional members from one structural element to the next makes it possible to combine with the characteristic feature which has been mentioned above the property of tolerating dimensional variations of the structure along its longitudinal dimension.

Further characteristic features of a heat-insulating structure in accordance with the invention will become apparent from the following description of a number of examples of construction and application which are given by way of indication and not in any limiting sense, reference being made to the accompanying drawings, wherein.

Figure 1:
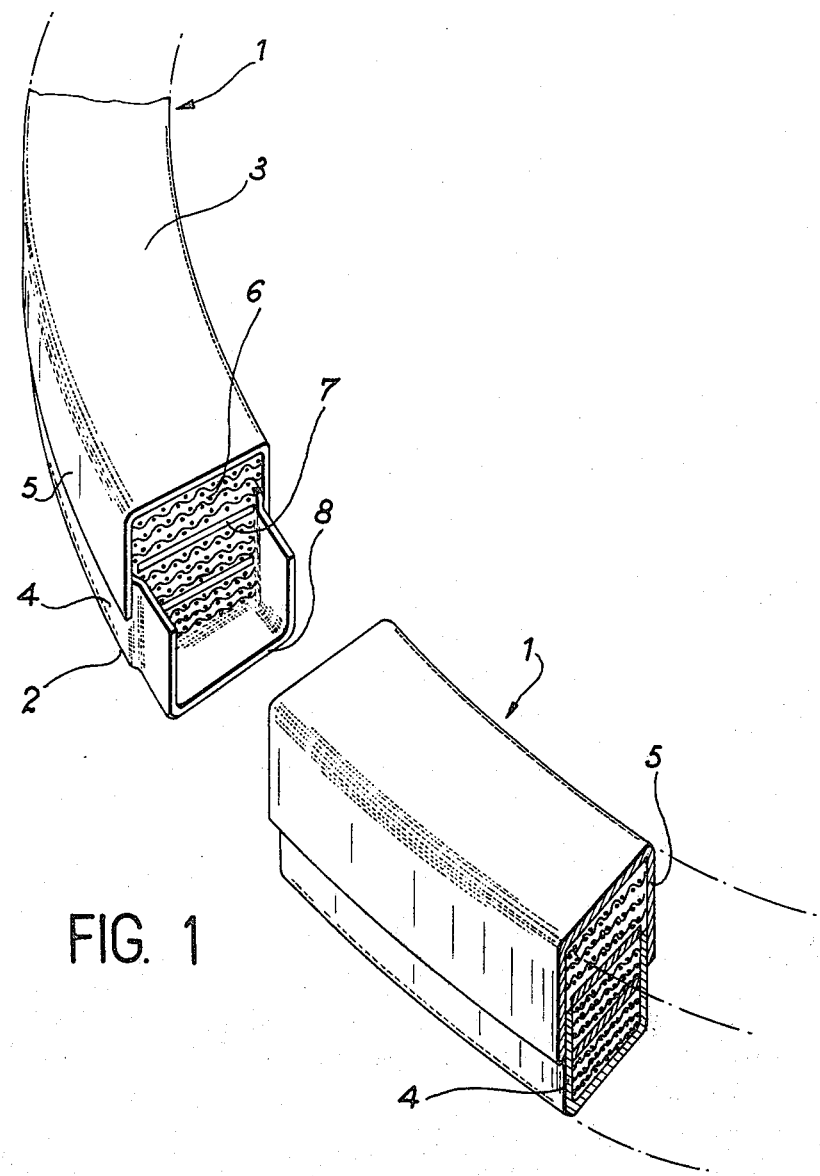
FIG. 1 is a diagrammatic view in perspective and in partial cross-section of the structure under consideration, which illustrates the shape of the constituent elements of said structure.

As is apparent from FIG. 1, the structure under consideration is constituted by the juxtaposition of a number of elements 1 which extend along the length of said structure, especially in order to constitute a continuous or non-continuous casing of annular shape or the like. These elements 1 are essentially constituted by two sectional members 2 and 3 respectively which are adapted to engage one inside the other and accordingly have the shape of a wide U. The parallel side flanges 4 and 5 of said section members slide with respect to each other and form between them a narrow clearance space which is capable of trapping the vapor or aerosols in the atmosphere which surrounds the structure. Within the space limited by the two sectional members which are thus interengaged, there is mounted a flexible stack of wire fabric or wire mesh elements 6 which have a certain degree of elasticity and constitute an effective thermal barrier across the structure. As an advantageous feature, the stack of wire fabric or wire mesh elements incorporates a series of small plates 7 which are parallel to the opposite bottom portions of the sectional members 2 and 3.

In accordance with one arrangement which is characteristic of the invention, each sectional member is provided at one end with an extension 8 having a cross-section which is slightly smaller than that of the sectional member in the remainder of its longitudinal development. This accordingly permits the interengagement of two adjacent sectional members along the length of the structure, which is in turn intended to permit the interassembly of the structural elements 1. The structure can consequently be given the desired length and can more closely conform to the shape of a zone or wall to be protected. In order to simplify the drawings, only the extension 8 of the sectional member 2 has been illustrated in the figure. It is readily apparent that a similar arrangement can be contemplated for the sectional member 3 so as to permit the engagement of this latter within the adjacent sectional member of the adjacent structural element.

Figure 2:
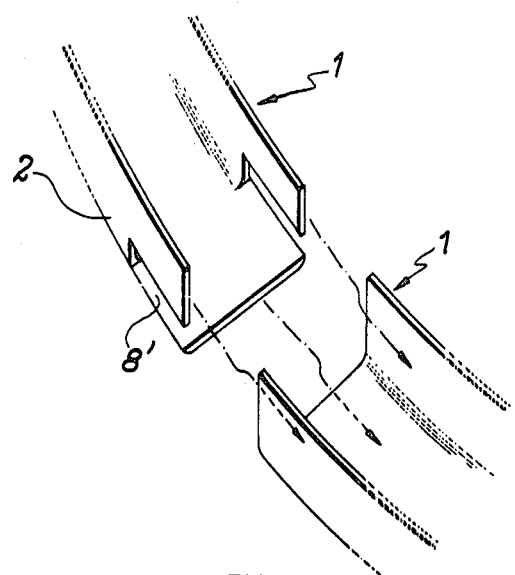
FIG. 2 illustrates an alternative form of construction.
Figure 3:
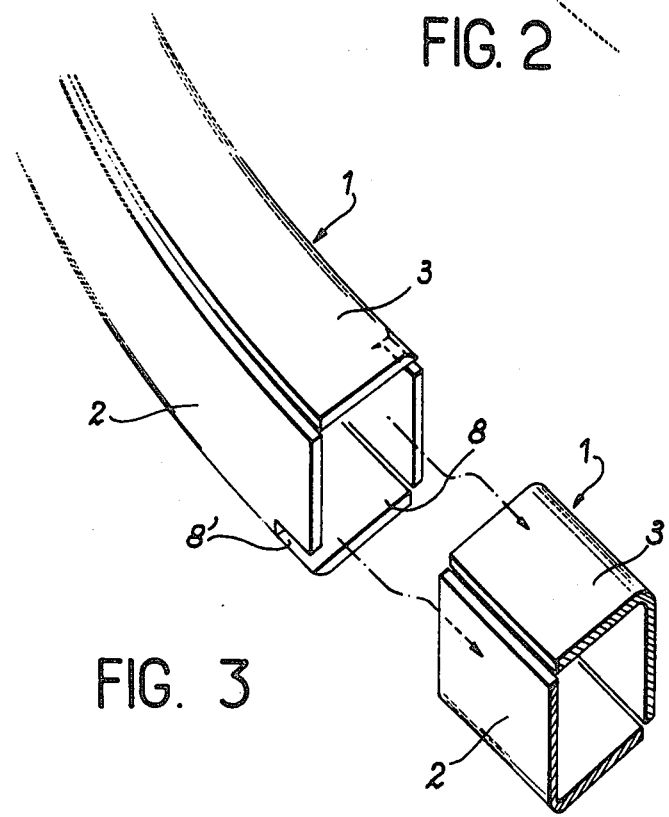
FIG. 3 illustrates another alternative form.

In another alternative embodiment which is illustrated in FIG. 2, the sectional member 2 for example can be provided in its side flanges 4 and 5 with open slots 8' so as to permit engagement within the adjacent sectional member and so on from one member to the next by virtue of the elasticity provided by said slots. Finally, in another embodiment which is illustrated in FIG. 3, the sectional members have an L-shaped cross-section which may or may not be provided with portions for interengagement of these latter. It is apparent from this figure that the sectional members 2 and 3 serve to confine the flexible stack of wire fabric or wire mesh elements 6 without entailing the need for interengagement. In consequence, the sectional members are readily capable of relative displacement if the need should arise. On the other hand, in two successive structural elements 1, the sectional members 2 and 3 respectively can comprise extensions 8 which may or may not have slots 8'. The assembly thus permits relative displacement of the sectional members along the length of the structure.

Figure 4:
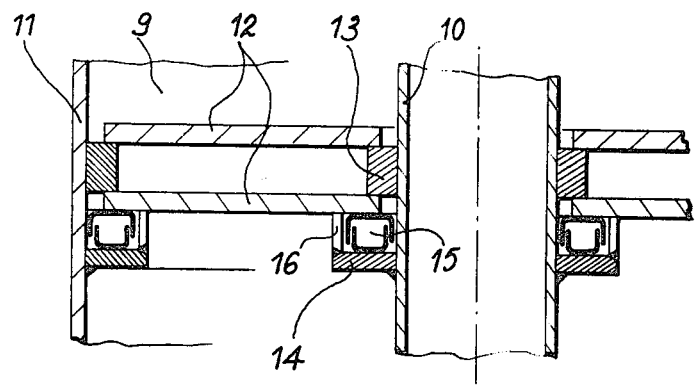
FIGS. 4 to 6 are diagrammatic views to a smaller scale showing different applications of the structure in accordance with FIG. 1 for the protection of zones or walls, especially in a corrosive and hazardous atmosphere at high temperature.
Figure 5:
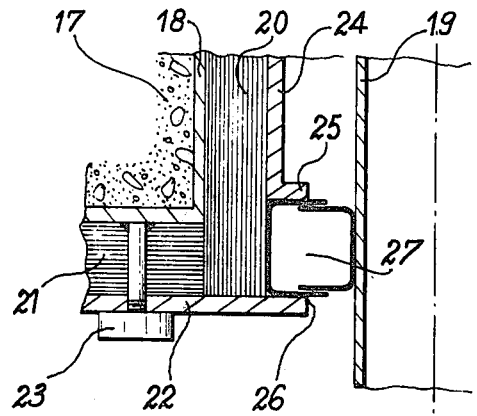
Figure 6:
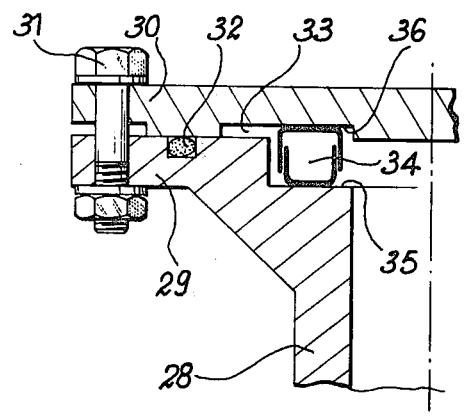

FIGS. 4 to 6 illustrate by way of indication a number of possibilities of application of the structural elements considered. In the mode of application illustrated in FIG. 4, it is thus desired to protect an annular space 9 against an atmosphere which is brought to a high temperature, said space being formed between two coaxial metallic walls 10 and 11 respectively. Protection is provided by means of a thermal barrier constituted by superposed plates 12 supported at a distance from each other by means of spacing blocks 13. As an advantageous feature, at least one of the plates 12 aforesaid rests on shelves 14 which are rigidly fixed to the external surface of the walls 10 and 11 by means of heat-insulating structures 15 which are constructed in accordance with FIG. 1. This arrangement has the advantage of tolerating relative displacement of the plate 12 with respect to the shelves 14 in the axial direction with relative compression of the insulating layers of wire fabric or wire mesh elements contained within the structures 15, said compression being limited by stop-ribs 16.

In another example of application which is illustrated in FIG. 5, the reference numeral 17 designates a portion of the vault roof of a fast reactor (not shown in the drawings). Said vault roof which is constructed of concrete is covered externally at the lower end and on the lateral face thereof with a metallic lining plate 18 provided with at least one through-passage for a shell 19. Against the lining plate 18 of the vault roof 17 is applied a thermal shield constituted by panels 20 and 21 which are held in position by means of a bearing plate 22, said plate being in turn rigidly fixed to the lining plate 18 by means of fixing studs 23. The panel 20 which is placed against the lateral portion of the lining plate 18 in parallel relation to the shell 19 is in turn maintained in position by means of a bearing plate 24 which is provided at the lower end with a flange 25. Said flange delimits with the peripheral edge 26 of the plate 22 a recess in which is mounted a heat-insulating structure 27 in accordance with the invention so as to permit of relative elastic displacement of the shell 19 in the radial direction.

Finally, in another example of application which is illustrated in FIG. 6, the end portion 28 of a duct element has a terminal annular shoulder 29 against which is applied a flange 30, said flange being held in position by means of a clamping bolt 31 which compresses a seal 32. Protection of said seal against sodium vapor and aerosols is achieved by mounting a heat-insulating structure 34 in accordance with the invention within the space 33 formed between the annular shoulder 29 and the flange 30. Said structure is applied between a bearing surface 35 of the annular shoulder 29 and a bearing surface 36 of the flange 31, the elasticity of the structure being exerted in this case along the axis of the duct 28.

It is readily apparent that the invention is not limited solely to the examples given in the foregoing but extends on the contrary to all alternative forms. In particular, another advantageous application of the structure under consideration could consist in the use of a series of L-section members arranged in interengaged relation so as to provide external protection for control instruments or devices which are immersed in the pressure vessel of a reactor, in particular an installation for the purification of sodium within a reactor which is cooled by a circulation of this liquid metal.

What I claim is:

1. A heat-insulating structure for use in the wall of a containment vessel for a nuclear reactor forming a heat source comprising a plurality of elements, two sectional members of substantial length for each of said elements, said elements being disposed in juxtaposed relation in line two angular end portions for each of said two sectional members engaged one inside the other, parallel faces for said elements having a small clearance space between said parallel faces, at least one of said angular portions of two successive ones of said elements being shaped for interengagement of said elements with play along their length, and a flexible packing of metallic material between said sectional members whereby said sectional members work in pairs along the length and in the direction of engagement of said members.

2. A heat-insulating structure according to claim 1, wherein the sectional members have a cross-section in the shape of a U.

3. A heat-insulating structure according to claim 1 including an extension for each of said sectional members at one end having a cross-section of said sectional member for engagement within the opposite end of a similar adjacent sectional member forming a continuous casting.

4. A heat-insulating structural according to claim 1 including at least one slot for each sectional member for the engagement of said member within the opposite end of an adjacent sectional member.

5. A heat-insulating structure according to claim 1, said flexible packing being a stack of wire fabric, and also wire mesh and also interlooped wire elements and also a packing of steel wool and shavings.

6. A heat-insulating structure according to claim 5, including at least one small internal plate mounted between and parallel to the bottom portion of the section members to limit the convection of heat through the packing.

7. A heat-insulating structure according to claim 1 wherein said sectional members have a cross-section in the shape of a L.

* * * * *